(12) United States Patent
Sun et al.

(10) Patent No.: US 10,667,638 B2
(45) Date of Patent: Jun. 2, 2020

(54) RECIPE GENERATION SYSTEM FOR COOKING DEVICE, AND COOKING DEVICE

(71) Applicants: Hao Sun, Dalian (CN); Yuanyuan Zhuang, Dalian (CN)

(72) Inventors: Hao Sun, Dalian (CN); Yuanyuan Zhuang, Dalian (CN)

(73) Assignees: Hao Sun, Dalian, Liaoning (CN); Yuanyuan Zhuang, Dalian, Liaoning (CN)

( * ) Notice: Subject to any disclaimer, the term of this patent is extended or adjusted under 35 U.S.C. 154(b) by 418 days.

(21) Appl. No.: 15/544,010

(22) PCT Filed: Dec. 15, 2015

(86) PCT No.: PCT/CN2015/097372
§ 371 (c)(1),
(2) Date: Jul. 16, 2017

(87) PCT Pub. No.: WO2016/112764
PCT Pub. Date: Jul. 21, 2016

(65) Prior Publication Data
US 2018/0000274 A1    Jan. 4, 2018

(30) Foreign Application Priority Data
Jan. 16, 2015 (CN) .......................... 2015 1 0024278

(51) Int. Cl.
*A47J 27/04* (2006.01)
*A47J 27/08* (2006.01)
(Continued)

(52) U.S. Cl.
CPC ............... *A47J 27/00* (2013.01); *A47J 36/00* (2013.01); *A47J 36/321* (2018.08)

(58) Field of Classification Search
CPC .. A47J 27/04; A47J 27/08; A47J 27/14; A47J 27/21; A47J 27/62; A47J 36/32
See application file for complete search history.

(56) References Cited

U.S. PATENT DOCUMENTS 9,119,501 B2 *   9/2015   Xie .......................... A47J 36/32
9,702,858 B1 *   7/2017   Minvielle .............. G01N 33/02
(Continued)

*Primary Examiner* — Michael A Laflame, Jr.
(74) *Attorney, Agent, or Firm* — PROI Intellectual Property US

(57) ABSTRACT

The present invention discovers a recipe generation system for a cooking appliance and the cooking appliance. The recipe generation system comprises an operation unit; a weight detection unit configured to measure initial weights of various cooking materials sequentially added into the cooking appliance and measure the overall weight of the cooking materials during cooking and finishing cooking; a timing unit; a parameter calculation unit configured to obtain proportions of the cooking materials based on the initial weights of the cooking materials and calculate weight losses of different cooking materials at different time points; and a parameter determination unit. The present invention can determine dish compositions, key cooking elements for forming the dish and cooking procedures by detection and information processing of a series of operations during cooking for use in subsequent cooking procedures.

17 Claims, 2 Drawing Sheets

(51) Int. Cl.
*A47J 27/14* (2006.01)
*A47J 27/00* (2006.01)
*A47J 36/32* (2006.01)
*A47J 36/00* (2006.01)

(56) References Cited

U.S. PATENT DOCUMENTS

| | | | |
|---|---|---|---|
| 2004/0173103 A1* | 9/2004 | Won | A47J 36/32 |
| | | | 99/326 |
| 2013/0011537 A1* | 1/2013 | Vahid | A47J 27/13 |
| | | | 426/523 |
| 2013/0125763 A1* | 5/2013 | Valance | A47J 27/00 |
| | | | 99/325 |
| 2016/0007644 A1* | 1/2016 | Hack | A47J 27/04 |
| | | | 99/333 |
| 2016/0198883 A1* | 7/2016 | Wang | A47J 27/08 |
| | | | 426/231 |
| 2016/0220064 A1* | 8/2016 | Young | A47J 36/00 |
| 2016/0278563 A1* | 9/2016 | Choudhary | A47J 27/004 |
| 2018/0140125 A1* | 5/2018 | Luo | A47J 36/32 |
| 2019/0313844 A1* | 10/2019 | Nadendla | A47J 36/32 |

* cited by examiner

RECIPE GENERATION SYSTEM FOR COOKING DEVICE, AND COOKING DEVICE

CROSS REFERENCE TO RELATED APPLICATIONS

The present application is the US national stage of International Patent Application PCT/CN2015/097372 filed on Dec. 15, 2015, which, in turn, claims priority to Chinese Patent Application CN 201510024278.7 filed on Jan. 16, 2015.

TECHNICAL FIELD

The present invention relates to the technical field of kitchen appliance, and particularly, to a recipe generation system for a cooking appliance and the cooking appliance.

BACKGROUND

A cooking appliance is a necessary household appliance in people's daily lives. In recent years, with the development of cooking appliances, their varieties are increased day by day, and the degree of automation is continuously improved, such as an automatic cooking pot, an intelligent cooker, or the like. These automatic cooking appliances and intelligent cookers are usually implemented by presetting fixed cooking programs and storing limited recipes, which can only cook limited dishes, but cannot expand personalized recipes; moreover, cooking parameters in the recipes are not clear and complete, and auxiliary functions for the cooking process are lacked, so that the quality of the dishes cooked is usually determined by the skills and experience of users, while a beginner needs to take many attempts to master these skills and experience particularly. In addition, more and more people have healthy diet concepts. To know the nutrition dose in every day or every meal is very helpful to form a reasonable and healthy diet scheme and make scientific evaluation to the diet scheme. Meanwhile, to know the nutrient, calories and other parameters of foods before selecting foods will be very helpful to the healthy diet of people, and particularly to the groups having food prohibition, it is very meaningful to know "sugar", "purine", "salt" and other content parameters in advance.

SUMMARY

The present invention develops a recipe generation system for a cooking appliance and the cooking appliance regarding the problems submitted above.

The technical solutions of the present invention are as follows.

A recipe generation system for a cooking appliance comprises:

an operation unit configured to turn on and off the cooking appliance, set a name for each cooking material added into the cooking appliance, adjust the heating power during cooking, input heating power changes during cooking and corresponding power change conditions, and input an addition occasion of each cooking material;

a weight detection unit configured to measure initial weights of cooking materials sequentially added into the cooking appliance and measure the overall weight of the cooking materials during cooking and finishing cooking;

a timing unit configured to calculate the cooking time;

a parameter calculation unit connected to the weight detection unit and the timing unit, and configured to obtain proportions of the cooking materials based on the initial weights of the cooking materials and calculate weight losses of different cooking materials at different time points; wherein the weight loss amount at any cooking time point is equal to a difference value between the initial overall weight of the cooking materials and the overall weight of the cooking materials at the cooking time point;

a parameter determination unit connected to the parameter calculation unit and the timing unit, and configured to determine a liquid-boiling time point according to changes of the weight losses of the cooking materials over the cooking time and to determine heating time after boiling according to the liquid-boiling time point and cooking finishing time;

a storage unit connected to the operation unit, the weight detection unit, the parameter calculation unit and the parameter determination unit, and configured to store the heating power while starting cooking, the heating power changes during cooking and corresponding power change conditions, the initial weight and addition order of each cooking material, the addition time of each cooking material, the overall weight of the cooking materials while finishing cooking, the proportion of each cooking material, the heating time after boiling, and a change relationship of the weight losses of the cooking materials over the cooking time; and a recipe generation unit connected to the storage unit, and configured to form a recipe having each cooking procedure according to the data above and store the recipe into the storage unit.

Further, the cooking materials comprise food materials, liquid ingredients and spices; the parameter calculation unit is further configured to calculate a liquid margin indicating parameter R1 at different cooking time points using a formula $$R1 = \frac{(B1 - A1)}{A1},$$

wherein B1 is the overall weight of the cooking materials during cooking, and A1 is the sum of the initial weights of the food materials and the spices added into the cooking appliance; and the storage unit is further configured to store the liquid margin indicating parameter R1 while finishing cooking.

Further, the recipe generation system further comprises a curve generation unit connected to the parameter calculation unit and the parameter determination unit; the curve generation unit is configured to generate a relationship curve between the weight losses of the cooking materials and the cooking time; the parameter determination unit determines the cooking time corresponding to a first raised inflection point in the relationship curve as the liquid-boiling time point according to the relationship curve between the weight losses of the cooking materials and the cooking time generated by the curve generation unit; the parameter determination unit is further configured to determine the heating time before boiling according to the liquid-boiling time point and the cooking starting time; and the storage unit is further configured to store the relationship curve between the weight losses of the cooking materials and the cooking time.

Further, the cooking procedures at least comprise:

the initial weight, addition order and addition occasion of each cooking material;

a cooking finishing condition; wherein the heating time after boiling and/or the liquid margin indicating parameter R1 while finishing cooking is used as the cooking finishing condition.

Further the parameter calculation unit is further configured to calculate a nutrient content, a purine content, a carbohydrate content, calories and a salinity of the dish per unit weight according to the initial weight of each cooking material and the overall weight of the cooking materials while finishing cooking; and the storage unit is configured to store the nutrient content, the purine content, the carbohydrate content, the calories and the salinity of the dish per unit weight.

Further, the operation unit is an operation panel disposed on the cooking appliance, or an intelligent terminal connected to the cooking appliance.

In addition, the operation unit is further configured to input an operational occasion for taking down or covering a lid of the cooking appliance; and the cooking procedures further comprise: an operational occasion for taking down or covering the lid during cooking;

the cooking procedures further comprise each cooking action, a cooking action execution occasion, and cooking action duration; and the operation unit is further configured to set a cooking action execution occasion, and input a cooking action name and a cooking action finishing operation, and the storage unit stores the cooking action, the corresponding cooking action execution occasion and the duration.

Further, the operation unit is further configured to receive an operation of setting edible oil types; the storage unit is stored with oil temperature limits corresponding to different edible oil types; the cooking appliance is also provided with a temperature sensor; and the heating power of the cooking appliance is controlled to make the highest temperature of the edible oil used currently be lower than the oil temperature limit.

A cooking appliance comprises:

the recipe generation system described according to any one above; wherein the operation unit is further configured to receive recipe setting information;

a prompt unit;

a processing unit connected to the operation unit, the storage unit, the weight detection unit and the prompt unit; wherein the processing unit takes a corresponding recipe according to the recipe setting information, determines the weights of remaining cooking materials according to the initial weight of one of the food materials added into the cooking appliance with reference to the proportion of each cooking material stored in the storage unit, replaces the initial weights of corresponding cooking materials in the recipe stored with the weights of the remaining cooking materials determined, and controls the prompt unit to prompt each cooking procedure in the recipe in sequence.

Further, the processing unit controls the cooking appliance to correspondingly adjust the heating power according to the heating power while starting cooking and when the current cooking process meets the power change conditions.

Further, the processing unit is also connected to the parameter calculation unit and the parameter determination unit, when a liquid margin indicating parameter R1' in the current cooking process is equal to the stored liquid margin indicating parameter R1, the heating time after boiling in the current cooking process is judged whether to be larger than or equal to the stored heating time after boiling; if yes, the cooking appliance is controlled to finish cooking; otherwise, the prompt unit is controlled to prompt whether to finish cooking; after the prompt unit prompts whether to finish cooking, if the operation unit does not receive operation information of finishing cooking, then the cooking appliance is controlled to reduce the heating power, and when the liquid margin indicating parameter R1' is lower than a preset limit, the prompt unit is controlled to prompt to stir fry and give burnt warning; wherein, the liquid margin indicating parameter during cooking $$R1' = \frac{(B1' - A1')}{A1'},$$

B1' is the overall weight of the cooking materials in the current cooking process, A1' is the sum of the initial weights of the food materials and the spices added into the cooking appliance in the current cooking process, and the heating time after boiling in the current cooking process is determined according to the liquid-boiling time point and the cooking finishing time.

Further, the processing unit is also connected to the curve generation unit, wherein a slope of the relationship curve in the current cooking process is compared with a slope of the relationship curve stored according to the relationship curve generated between the weight losses of the cooking materials in the current cooking process and the cooking time, when the slope of the relationship curve in the current cooking process is larger than the slope of the relationship curve stored, the cooking appliance is controlled to reduce the heating power according to the proportion of slope, and when the slope of the relationship curve in the current cooking process is smaller than the slope of the relationship curve stored, the cooking appliance is controlled to increase the heating power according to the proportion of slope.

Further, the processing unit is also connected to the parameter calculation unit and the parameter determination unit, when the heating time after boiling in the current cooking process is equal to the stored heating time after boiling, the liquid margin indicating parameter R1' in the current cooking process is judged whether to be smaller than or equal to the stored liquid margin indicating parameter R1; if yes, the cooking appliance is controlled to finish cooking; otherwise, the prompt unit is controlled to prompt whether to finish cooking; after the prompt unit prompts whether to finish cooking, if the operation unit does not receive operation information of finishing cooking, then the cooking appliance is controlled to increase the heating power, and when the liquid margin indicating parameter R1' is equal to the stored liquid margin indicating parameter R1, the cooking appliance is controlled to finish cooking; wherein, the liquid margin indicating parameter in the current cooking process $$R1' = \frac{(B1' - A1')}{A1'},$$

B1' is the overall weight of the cooking materials in the current cooking process, A1' is the sum of the initial weights of the food materials and the spices added into the cooking appliance in the current cooking process, and the heating time after boiling in the current cooking process is determined according to the liquid-boiling time point and the cooking finishing time.

Further, the parameter calculation unit is further configured to calculate a nutrient content, a purine content, a carbohydrate content, calories and a salinity of the dish per unit weight according to the initial weight of each cooking material and the overall weight of the cooking materials while finishing cooking; and the prompt unit is configured to prompt the nutrient content, the purine content, the carbohydrate content, the calories and the salinity of the dish per unit weight.

Further, the processing unit is further configured to control the prompt unit to give overload warning when the sum of the weights of the cooking materials added into the cooking appliance exceeds the maximum containable weight of the cooking appliance; the storage unit is also stored with the weight of a lid of the cooking appliance; and the processing unit automatically judges a covering or taking down status of the lid when the weight detection unit detects that the cooking appliance is increased or reduced by the weight equal to the weight of the lid stored.

Further, the processing unit is further configured to control the prompt unit to prompt that the cooking material is excessively more or less when any cooking material added into the cooking appliance is not within the weight scope of the cooking material determined.

Further, the weight detection unit is further configured to measure the reduced weight of the dish in the cooking appliance after the dish is cooked; the parameter calculation unit obtains the nutrient content, the purine content, the carbohydrate content, the calories and the salinity obtains the nutrient content, the purine content, the carbohydrate content, the calories and the salinity in the dish reduced according to the reduced weight of the dish with reference to the nutrient content, the purine content, the carbohydrate content, the calories and the salinity of the dish per unit weight, and prompts through the prompt unit.

By adopting the technical solutions above, for the recipe generation system for a cooking appliance and the cooking appliance provided by the present invention, the recipe generation system determine dish compositions, key cooking elements for forming the dish and cooking procedures by detection and information processing of a series of operations during cooking for use in subsequent cooking procedures, and store them for using in a subsequent cooking process, which can provide clear and comprehensive parameters for the subsequent cooking process. Moreover, the recipes can be conveniently expanded through the recipe generation system, which is beneficial for continuously improving the dishes and facilitating meeting personalized diet requirements. The cooking appliance can automatically control the subsequent cooking process according to all cooking parameters obtained through the recipe generation system, so as to make the cooking process be more convenient, and the tastes of the dishes cooked are better and the repeatability is good; and analysis on the nutrient, the purine content, the carbohydrate content and the calories of the dish is beneficial for promoting the diet health of people.

in the figures: 1 refers to operation unit, 2 refers to weight detection unit, 3 refers to timing unit, 4 refers to parameter calculation unit, 5 refers to curve generation unit, 6 refers to parameter determination unit, 7 refers to storage unit, 8 refers to recipe generation unit, 9 refers to processing unit, and 10 refers to prompt unit.

DETAILED DESCRIPTION

Figure 1:
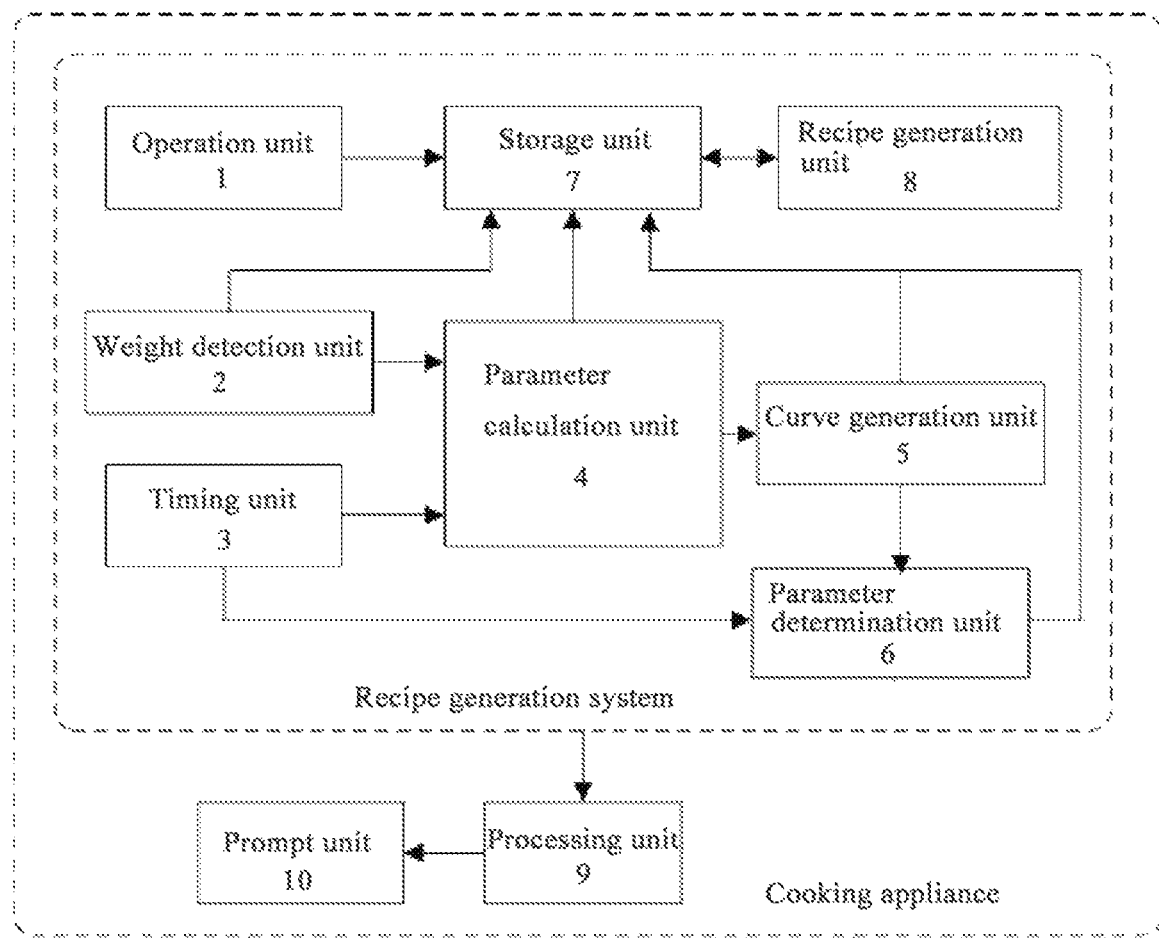
FIG. 1 is a structural block diagram of a recipe generation system and a cooking appliance according to the present invention.
Figure 2:
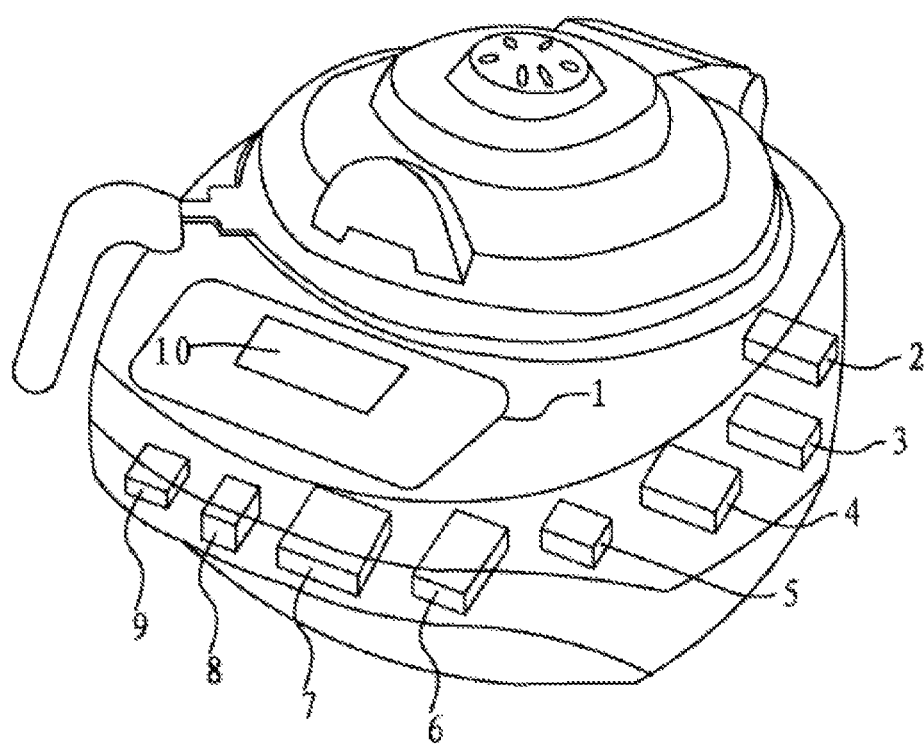
FIG. 2 is a structural schematic diagram of the recipe generation system and the cooking appliance according to the present invention.

FIG. 1 and FIG. 2 illustrate a recipe generation system for a cooking appliance. The recipe generation system comprises an operation unit 1 configured to turn on and off the cooking appliance, set a name for each cooking material added into the cooking appliance, adjust the heating power during cooking, input heating power changes during cooking and corresponding power change conditions, and input an addition occasion of each cooking material; a weight detection unit 1 configured to measure initial weights of the cooking materials sequentially added into the cooking appliance and measure the overall weight of the cooking materials during cooking and finishing cooking; a timing unit 3 configured to calculate the cooking time; a parameter calculation unit 4 connected to the weight detection unit 2 and the timing unit 3, and configured to obtain proportions of the cooking materials based on the initial weights of the cooking materials and calculate weight losses of different cooking materials at different time points; wherein the weight loss at any cooking time point is equal to a difference value between the initial overall weight of the cooking materials and the overall weight of the cooking materials at the cooking time point; a parameter determination unit 6 connected to the parameter calculation unit 4 and the timing unit 3, and configured to determine a liquid-boiling time point according to changes of the weight losses of the cooking materials over the cooking time and to determine heating time after boiling according to the liquid-boiling time point and cooking finishing time; wherein the parameter determination unit calculates the weight losses $\Delta W$ of the cooking materials at different cooking time points using a formula $\Delta W = A1 + T0 - B1$, wherein B1 is the overall weight of the cooking material during cooking, A1 is the sum of the initial weights of the food materials and the spices added into the cooking appliance, and T0 is the sum of the initial weights of the liquid ingredients added into the cooking appliance; further, the heating time after boiling $T2 = SK2 - SK1$, wherein SK1 is the liquid-boiling time point and SK2 is the cooking finishing time point; a storage unit 7 connected to the operation unit 1, the weight detection unit 2, the parameter calculation unit 4 and the parameter determination unit 6, and configured to store the heating power while starting cooking, the heating power changes during cooking and the corresponding power change conditions, the initial weight and addition order of each cooking material, the addition occasion of each cooking material, the overall weight of the cooking materials while finishing cooking, the proportion of each cooking material, the heating time after boiling, and a change relationship of the weight losses of the cooking materials over the cooking time; and a recipe generation unit 8 connected to the storage unit 7, and configured to form a recipe having each cooking procedure according to the data stored in the storage unit 7 and store the recipe into the storage unit 7; further, the cooking materials comprise food materials, liquid ingredients and spices; the parameter calculation unit 4 is further configured to calculate a liquid margin indicating parameter R1 at different cooking time points using a formula $$R1 = \frac{(B1 - A1)}{A1},$$

wherein B1 is the overall weight of the cooking materials during cooking, and A1 is the sum of the initial weights of the food materials and the spices added into the cooking appliance; the storage unit 7 is further configured to store the liquid margin indicating parameter R1 while finishing cooking; further, the recipe generation system further comprises a curve generation unit 5 connected to the parameter calculation unit 4 and the parameter determination unit 6; the curve generation unit 5 is configured to generate a relationship curve between the weight losses of the cooking materials and the cooking time; the parameter determination unit 6 determines the cooking time corresponding to a first raised inflection point in the relationship curve as the liquid-boiling time point according to the relationship curve between the weight losses of the cooking materials and the cooking time generated by the curve generation unit 5; the parameter determination unit 6 is further configured to determine the heating time before boiling according to the liquid-boiling time point and the cooking starting time; the heating time before boiling T1=SK1−SK0 wherein SK1 is the liquid-boiling time point and SK0 is the cooking starting time point; and the storage unit 7 is further configured to store the relationship curve between the weight losses of the cooking materials and the cooking time; further, the cooking procedures at least comprise the initial weight, addition order and addition occasion of each cooking material; a cooking finishing condition; wherein the heating time after boiling and/or the liquid margin indicating parameter R1 while finishing cooking is used as the cooking finishing condition; further the parameter calculation unit 4 is further configured to calculate a nutrient content, a purine content, a carbohydrate content, calories and a salinity of the dish per unit weight according to the initial weight of each cooking material and the overall weight of the cooking materials while finishing cooking; and the storage unit is configured to store the nutrient content, the purine content, the carbohydrate content, the calories and the salinity of the dish per unit weight; further, the operation unit 1 is an operation panel disposed on the cooking appliance, or an intelligent terminal connected to the cooking appliance; in addition, the operation unit 1 is further configured to input an operational occasion for taking down or covering a lid of the cooking appliance; the cooking procedures further comprise: an operational occasion for taking down or covering the lid during cooking; the cooking procedures further comprise each cooking action, a cooking action execution occasion, and cooking action duration; the operation unit 1 is further configured to set a cooking action execution occasion, and input a cooking action name and a cooking action finishing operation, and the storage unit 7 stores the cooking action, the corresponding cooking action execution occasion and the duration; further, the operation unit 1 is further configured to receive an operation of setting edible oil types; the storage unit 7 is stored with oil temperature limits corresponding to different edible oil types; the cooking appliance is also provided with a temperature sensor; and the processing unit 9 controls the heating power of the cooking appliance to make the highest temperature of the edible oil used currently be lower than the oil temperature limit; and the recipe generation system can generate multiple recipes according to different cooking processes.

The cooking appliance as illustrated in FIG. 1 and FIG. 2 comprises: the recipe generation system according to any one above, wherein the operation unit 1 is further configured to receive recipe setting information;

a prompt unit 10; a processing unit 9 connected to the operation unit 1, the storage unit 7, the weight detection unit 2 and the prompt unit 10; wherein the processing unit 9 takes a corresponding recipe according to the recipe setting information, determines the weights of remaining cooking materials according to the initial weight of one of the food materials added into the cooking appliance with reference to the proportion of each cooking material stored in the storage unit 7, replaces the initial weights of corresponding cooking materials in the recipe stored with the weights of the remaining cooking materials determined, and controls the prompt unit 10 to prompt each cooking procedure in the recipe in sequence;

further, the processing unit 9 controls the cooking appliance to correspondingly adjust the heating power according to the heating power while starting cooking and when the current cooking process meets the power change conditions; further, the processing unit 9 is also connected to the parameter calculation unit 4 and the parameter determination unit 6, when a liquid margin indicating parameter R1' in the current cooking process is equal to the stored liquid margin indicating parameter R1, the heating time after boiling in the current cooking process is judged whether to be larger than or equal to the stored heating time after boiling T2; if yes, the cooking appliance is controlled to finish cooking; otherwise, the prompt unit 10 is controlled to prompt whether to finish cooking; after the prompt unit 10 prompts whether to finish cooking, if the operation unit 1 does not receive operation information of finishing cooking, then the cooking appliance is controlled to reduce the heating power, and when the liquid margin indicating parameter R1' is lower than a preset limit, the prompt unit 10 is controlled to prompt to stir fry and give burnt warning; wherein, the liquid margin indicating parameter during cooking $$R1' = \frac{(B1' - A1')}{A1'},$$

the heating time after boiling in the current cooking process is determined according to the liquid-boiling time point and the cooking finishing time, wherein B1' is the overall weight of the cooking materials in the current cooking process, A1' is the sum of the initial weights of the food materials and the spices added into the cooking appliance in the current cooking process; to be specific, the heating time after boiling in the current cooking process T2'=SK2'−SK1', wherein SK1' is the liquid-boiling time point in the current cooking process and SK2" is the current time point; further, the processing unit 9 is also connected to the curve generation unit 5, wherein a slope of the relationship curve in the current cooking process is compared with a slope of the relationship curve stored according to the relationship curve generated between the weight losses of the cooking materials in the current cooking process and the cooking time, when the slope of the relationship curve in the current cooking process is larger than the slope of the relationship curve stored, the cooking appliance is controlled to reduce the heating power according to the proportion of slope, and when the slope of the relationship curve in the current cooking process is smaller than the slope of the relationship curve stored, the cooking appliance is controlled to increase the heating power according to the proportion of slope; and the proportion of slope is the proportion between the slope of the relationship curve in the current cooking process and the slope of the relationship curve stored; further, the processing unit 9 is also connected to the parameter calculation unit 4 and the parameter determination unit 6, when the heating time after boiling in the current cooking process is equal to the stored heating time after boiling, the liquid margin indicating parameter R1' in the current cooking process is judged whether to be smaller than or equal to the stored liquid margin indicating parameter R1; if yes, the cooking appliance is controlled to finish cooking; otherwise, the prompt unit 10 is controlled to prompt whether to finish cooking; after the prompt unit 10 prompts whether to finish cooking, if the operation unit 1 does not receive operation information of finishing cooking, then the cooking appliance is controlled to increase the heating power, and when the liquid margin indicating parameter R1' is equal to the stored liquid margin indicating parameter R1, the cooking appliance is controlled to finish cooking; wherein, the liquid margin indicating parameter in the current cooking process $$R1' = \frac{(B1' - A1')}{A1'},$$

B1' is the overall weight of the cooking materials in the current cooking process, A1' is the sum of the initial weights of the food materials and the spices added into the cooking appliance in the current cooking process, and the heating time after boiling in the current cooking process is determined according to the liquid-boiling time point and the cooking finishing time; further, the parameter calculation unit 4 is further configured to calculate a nutrient content, a purine content, a carbohydrate content, calories and a salinity of the dish per unit weight according to the initial weight of each cooking material and the overall weight of the cooking materials while finishing cooking; and the prompt unit 10 is configured to prompt the nutrient content, the purine content, the carbohydrate content, the calories and the salinity of the dish per unit weight; further, the processing unit 9 is further configured to control the prompt unit 10 to give overload warning when the sum of the weights of the cooking materials added into the cooking appliance exceeds the maximum containable weight of the cooking appliance; further, the processing unit 9 is further configured to control the prompt unit 10 to prompt that the cooking material is excessively more or less when any cooking material added into the cooking appliance is not within the weight scope of the cooking material determined; and further, the weight detection unit 2 is further configured to measure the reduced weight of the dish in the cooking appliance after the dish is cooked; the parameter calculation unit 4 obtains the nutrient content, the purine content, the carbohydrate content, the calories and the salinity in the dish reduced according to the reduced weight of the dish with reference to the nutrient content, the purine content, the carbohydrate content, the calories and the salinity of the dish per unit weight, and prompt through the prompt unit 10.

For the recipe generation system for a cooking appliance and the cooking appliance provided by the present invention, the recipe generation system determine dish compositions, key cooking elements for forming the dish and cooking procedures by detection and information processing of a series of operations during cooking for use in subsequent cooking procedures, and store them for using in a subsequent cooking process, which can provide clear and comprehensive parameters for the subsequent cooking process. Moreover, the recipes can be conveniently expanded through the recipe generation system, which is beneficial for continuously improving the dishes and facilitating meeting personalized diet requirements. The cooking appliance can automatically control the subsequent cooking process according to all cooking parameters obtained through the recipe generation system, so as to make the cooking process be more convenient, and the tastes of the dishes cooked are better and the repeatability is good; and analysis on the nutrient, the purine content, the carbohydrate content and the calories of the dish is beneficial for promoting the diet health of people.

The weight of each cooking material to a dish according to the present invention may be adjusted according to the number of different meals of the user, which only needs to guarantee the proportion of all the cooking materials; and the recipes generated may be shared through network or the social contact media.

The operation unit 1 according to the present invention is further configured to receive an operation of setting edible oil types; the types of food materials may be set through the operation unit 1; when the operation unit 1 is an intelligent terminal connected to the cooking appliance, the intelligent terminal may be connected to the cooking appliance through a wireless communication mode; the recipe generation system may also classify all food materials into main food materials and auxiliary food materials through the operation unit 1; before cooking the dish, the cooking appliance may show the cutting, matching and preprocessing of all the food materials to the user by picture and literal statement; the storage unit 7 is stored with the oil temperature limits corresponding to different types of edible oil; the cooking appliance is also provided with a temperature sensor; and the processing unit 9 makes the highest temperature of the edible oil used currently be lower than the oil temperature through controlling the heating power of the cooking appliance. The weight detection unit 2 according to the present invention is a weight sensor, which specifically may be installed at the bottom of the cooking appliance, the weight detection unit 2 may finish shelling and zero correction while starting cooking; when one type of cooking material is added, the increased weight of the cooking appliance is the weight of the cooking material; and the prompt unit 10 is a voice prompt module and/or a display module. The storage unit 7 according to the present invention is also stored with the weight of a lid of the cooking appliance; and the processing unit 9 automatically judges a covering or taking down status of the lid when the weight detection unit 2 detects that the cooking appliance is increased or reduced by the weight equal to the weight of the lid stored; to be specific, after prompting to cover or take down the lid in the subsequent cooking process, the weight detection 2 detects the increased or reduced weight of the cooking appliance to obtain the weight value of the lid; when prompting to cover or take down the lid thereafter, if the weight equal to the weight value of the lid is detected, then the lid is judged to be automatically covered or taken down; during the actual process, the weight of the lid may also be obtained by a following method except storing the weight of the lid in the storage unit in advance: prompting "please cover or take down the lid and measure the weight of the lid"; the weight detection unit detects the weight changes and stores the weight changes, and then prompts "the weight of the lid is detected, and a covering or taking down operation of the lid will be automatically detected subsequently"; in addition, in the subsequent process of automatically detecting the lid, in order to reduce misjudgement, when the difference between the detected weight and the stored weight of the lid is in an error scope, the reading time of the weight detection unit from starting reading to stable reading is also detected, and in view of the response time of the weight detection unit, when the stable reading time is smaller than 3 s, it is judged to be the lid; otherwise, the user is queried.

In addition, when the overall weight of the cooking materials during cooking is determined, pay attention that when the lid is in a covered status, the weight of the lid needs to be removed to determine the overall weight of the cooking materials. The liquid ingredients according to the present invention comprise: water, soy sauce, vinegar, cooking wine, various spoon meats, or the like; the spices comprise minute amounts of green onion, ginger, garlic, salt and so on; the parameter determination unit 6 determines the cooking time corresponding to a first raised inflection point in the relationship curve as the liquid-boiling time point SK1 according to the relationship curve between the weight losses ΔW of the cooking materials and the cooking time generated by the curve generation unit 5; a main cooked and mushy process of the food begins from the liquid-boiling time point SK1 to the cooking finishing time, so the heating time after boiling T2=SK2−SK1 is an important cooking parameter; meanwhile, the slope of the relationship curve above is in direct proportion to the heating power, so the stored slope of the relationship curve (the relationship curve of the cooking process generating the recipe) may be used as a parameter for the intelligent regulation of the heating power in the subsequent cooking process; and the prompt unit 10 may prompt the name and addition weight of the cooking material according to the addition order and addition occasion of each cooking material.

The liquid margin indicating parameter R1 and the proportion of each cooking material greatly affect the cooking taste; the stored liquid margin indicating parameter R1 and the liquid margin indicating parameter R1' in the current cooking process intuitively reflect the evaporation and loss of water during cooking; the parameters are changed dynamically during cooking, and may be continuously reduced after the liquid is boiled.

In the recipe generating process, the heating power changes during cooking and corresponding power change conditions are input through the operation unit 1, and the power change conditions may be as follows:

① adjusting the heating power to a first preset power after the temperature of the cooking material reaches to a certain target temperature;

② adjusting the heating power to a second preset power after liquid ingredients are added;

③ adjusting the heating power to a third preset power after the liquid is boiled;

④ adjusting the heating power to a fourth preset power after the liquid margin indicating parameter reaches to a fixed value;

⑤ adjusting the heating power to a fifth preset power after the weights of the cooking materials during cooking reach to a preset value; and ⑥ adjusting the heating power to a sixth preset power after the slope of the relationship curve between the weight losses ΔW of the cooking materials and the cooking time reaches to a preset value.

During the process of using the generated recipe to guide the subsequent cooking, the processing unit 9 controls the cooking appliance to correspondingly adjust the heating power when the current cooking process meets the power change conditions. To be specific, regarding to the power change condition ①: the cooking appliance is provided with a temperature sensor that detects the temperature of the cooking materials, when the temperature reaches the preset target temperature, the power change condition is deemed to be met, and the processing unit 9 controls the cooking appliance to adjust the heating power to the first preset power; regarding to the power change condition ②: when the weight detection unit 2 detects that the liquid ingredients are added into the cooking appliance, the processing unit 9 controls the cooking appliance to adjust the heating power to the second preset power; regarding to the power change condition ③: after the parameter determination unit 6 determines the liquid-boiling time point SK1' in the current cooking process, the processing unit 9 controls the cooking appliance to adjust the heating power to the third preset power after the time point SK1'; regarding to the power change condition ④: after the liquid margin indicating parameter R1' calculated by the parameter calculation unit 4 is judged to reach the fixed value, the cooking appliance is controlled to adjust the heating power to the fourth preset power; regarding to the power change condition ⑤: after the weight detection unit 2 detects that the weight of the cooking materials during cooking reaches the preset value, the processing unit 9 adjusts the heating power to the fifth preset power; and regarding to the power change condition ⑥: after the slope of the relationship curve between the weight losses ΔW of the cooking materials and the cooking time generated by the curve generation unit 5 reaches the preset value, the processing unit 9 adjusts the heating power to the sixth preset power.

In the recipe generation process, the addition occasion of each cooking material is input through the operation unit 1, and the addition occasion may be as follows.

A certain food material is added after reaching a certain preset condition, wherein the preset condition may be "liquid boiling" (the liquid-boiling time point SK1), "the liquid margin indicating parameter reaching to the fixed value", "the temperature of the cooking material reaching to a certain target temperature", "a certain time after adding the previous cooking material", "the weight of the cooking material during cooking reaching to the preset value", "the slope of the relationship curve between the weight losses ΔW of the cooking material and the cooking time reaching the preset value", etc. and the certain time may be 0 min, and may be delaying for ## min. To be specific, the processing unit 9 obtains the preset conditions by determining the liquid-boiling time point SK1' in the current cooking process through the parameter determination unit 6, judging that the liquid margin indicating parameter R1' calculated by the parameter calculation unit 4 reaches the fixed value, detecting the temperature of the cooking material through the temperature sensor, and judging that the temperature reaches the certain target temperature, timing for a certain period using the timing unit 3 after measuring that the liquid ingredients are added into the cooking appliance through the weight detection unit 2, detecting the weight of the cooking material during cooking through the weight detection unit 2, judging that the weight change of the cooking material reaches the preset value, and judging that the slope of the relationship curve reaches the preset value according to the relationship curve between the weight losses ΔW' of the cooking materials generated by the curve generation unit 5 and the cooking time; after the preset conditions are reached, the processing unit 9 controls the prompt unit 10 to prompt to add a certain food material.

The cooking procedures according to the present invention also comprise various cooking actions and cooking action duration. To be specific, the cooking action may be to stir fry and stir fry to brown; and the cooking action duration may be to stir fry for 10 min and stew for 30 min; the operation unit 1 is further configured to set the cooking action execution occasion and input the cooking action name and the cooking action finishing operation, and the storage unit 7 stores the cooking action, the corresponding cooking action execution occasion and the duration; and the cooking action duration can be determined according to the cooking action execution occasion and the cooking action finishing operation, and the corresponding cooking time.

The nutrient content, the purine content, the carbohydrate content and the calories of the common food materials can be obtained through querying a nutrient content list, a purine content list, a carbohydrate content list and a food calories list of the foods, and the salinity of the dish per unit weight is obtained through dividing the weight of salt added into the cooking appliance by the overall weight of the cooking materials while finishing cooking; and the nutrient, the purine content, the carbohydrate content and the calories of each dish generated by the recipe generation system have guide meaning to the user who can select the recipe according to the nutrition analysis parameters above; when the user cooks a dish, the nutrition analysis parameters calculated by the cooking appliance are convenient for the user to fully understand the nutrient, the purine content, the carbohydrate content and the calories taken in each meal, are beneficial for adjusting and optimizing the diet scheme and make the diet be more healthy, and are more meaningful for the group needing diet control such as the group sensitive to sugar intake.

Actually, the recipe generated by the recipe generation system may be stored in a form of data record and curve, such as the relationship curve between the weight losses of the cooking materials and the cooking time, the relationship curve between the temperature of the cooking materials and the cooking time, the corresponding curve of the addition parameter of the cooking material and the addition occasion, and the corresponding curve of the heating power changes during cooking and the power change condition; the addition parameter of the cooking material comprises the initial weight and the addition order; the data record comprises the heating time before and after boiling, the liquid margin indicating parameter, the dish weight while finishing cooking, etc. and for the non-heating cooking item, only corresponding curve of the addition parameter of the cooking material and the addition occasion is recorded. The present invention may set a first cooking process and a second cooking process through the operation unit, wherein the first cooking process is corresponding to the recipe generation process, and the second cooking process is corresponding to the cooking process of taking the existed recipe; non-heating cooking and heating cooking may also be set regarding whether heating is needed during the cooking process.

The specific process of the present invention is illustrated hereinafter using braised pork chops as an example, and the example is a preferable embodiment, wherein the steps are not completely necessary parts of the present invention, and may be deleted or added according to the actual requirement.

I. Cooking Process Generated Correspondingly Recipe:

1. Complete cutting, matching and preprocessing of each food material before cooking firstly:
   ① cutting pork ribs into pieces ② blanching and draining off the pork ribs ③ adding Chinese prickly ash into cold water and boiling by big fire ④ adding the pork ribs after the water is boiled to boil the pork ribs up by big fire and then remove float foams ⑤ finishing out the pork ribs for standby use and ⑥ cutting green onion into segments; storing the processing procedures above into the storage unit by picture and literal statement; the recipe generation system according to the present invention has prompt functions with the cooking process, and interaction with the user is finished through controlling the execution of the prompt functions;

2. setting and storing the heating power while starting cooking;

3. resetting the weight detection unit, starting heating, and calculating the cooking time, calculating the weight losses of the cooking materials at different cooking time points in real time, and calculating the liquid margin indicating parameter R1 at different cooking time points by a formula $$R1 = \frac{(B1 - A1)}{A1};$$

4. prompting "to add a first cooking material";

5. adding edible oil and setting the name of the cooking material added into the cooking appliance;

6. detecting the weight change of the cooking appliance by the weight detection unit, and prompting that "the edible oil has been added and please confirm if the addition is finished" when the weight is increased;

7. storing the initial weight (30 g) of the edible oil after the confirmation of the user; when the heating power changes and corresponding power change conditions are input through the operation unit while heating the edible oil, then storing the heating power changes and the corresponding power change conditions in the meanwhile;

8. prompting "to add a second cooking material";

9. Adding the green onion segments and setting the name of the cooking material added into the cooking appliance; the weight detection unit detects the weight change of the cooking appliance, when the weight is increased, then "the green onion segments have been added and please confirm if the addition is finished" is prompted, and the initial weight (40 g) of the green onion segments is stored after the confirmation of the user; meanwhile, a green onion addition occasion is stored, wherein the addition occasion is that the oil temperature reaches 220° C.; in addition, a stirring name of the green onion segments is input, and a stirring action execution occasion is stored to be the occasion after the green onion segments are added; a green onion segment stirring finishing operation is input through the operation unit after the green onion segments are stirred fry, and the duration of the stirring action of the green onion segments is determined to be 10 s according to the stirring action execution occasion and the stirring finishing operation, and then stored;

10. prompting "to add a third cooking material";

11. adding the pork ribs processed in advance and setting the name of the cooking material added into the cooking appliance;

the weight detection unit detects the weight change of the cooking appliance, when the weight is increased, then "the pork ribs have been added and please confirm if the addition is finished" is prompted, and the initial weight (820 g) of the pork ribs is stored after the confirmation of the user; meanwhile, an addition occasion of pork ribs is stored, wherein the addition occasion refers to the occasion after the green onion segments are stirred fry for 10 seconds; in addition, a cooking action of the stirring fry the pork ribs to be brown is input, and the stirring action execution occasion is stored as the occasion after the pork ribs are added, and the information above is stored; if the heating power needs to be changed while heating the pork ribs, the heating power changes and the power change condition are input through the operation unit, and are stored at the same time; and meanwhile, the temperature change of the cooking material may be recorded while heating the pork ribs;

12. prompting "to add a fourth cooking material";

13. adding light soy sauce and setting the name of the cooking material added into the cooking appliance;

the weight detection unit detects the weight change of the cooking appliance, when the weight is increased, then "the light soy sauce has been added and please confirm if the addition is finished" is prompted, and the initial weight (30 g) of the light soy sauce is stored after the confirmation of the user; meanwhile, a light soy sauce addition occasion is stored, wherein the addition occasion refers to the occasion after the pork ribs are stirred fry for 3 minutes; and in addition, the cooking action is input as stirring with the light soy sauce, the stored stirring action execution occasion refers to the occasion after the light soy sauce is added, and the stored stirring action duration is 2 min; and if the heating power needs to be changed while heating the light soy sauce, the heating power changes and the power change condition are input through the operation unit, and stored at the same time, and meanwhile, the temperature change of the cooking material may be recorded while heating the light soy sauce;

14. prompting "to add a fifth cooking material";

15. adding water and setting the name of the cooking material added into the cooking appliance;

the weight detection unit detects the weight change of the cooking appliance, when the weight is increased, then "the water has been added and please confirm if the addition is finished" is prompted, and the initial weight (980 g) of the water is stored after the confirmation of the user; and meanwhile, a water addition occasion is stored, and the addition occasion refers to the occasion after the light soy sauce is stirred fry for 2 min;

16. prompting "to add a sixth cooking material" is prompted;

adding salt and setting and the name of the cooking material added into the cooking appliance;

the weight detection unit detects the weight change of the cooking appliance, when the weight is increased, then "the salt has been added and please confirm after the addition is finished", and the initial weight (6 g) of the salt is stored after the confirmation of the user; the heating power is set as 2000 W, and the power change condition is input as after the salt is added, which is stored with the heating power changes when the heating power changes reach 2000 W at the same time; and the parameter determination unit determines the liquid-boiling time point according to changes of the weight losses of the cooking materials over the cooking time;

17. The lid is covered and the operation occasion of covering the lid is stored, the operation occasion refers to 20 s after the liquid is boiled, the heating power is set to be 1000 W, and the power change condition is input as after the lid is covered, and is stored with the heating power changes when the heating power changes reach 1000 W; and when the increased weight of the cooking appliance detected by the weight detection unit is equal to the weight of the lid, the lid is judged to be covered, and pay attention to reduce the effect of the weight of the lid to other weight parameters;

18. the heating power is set to be 2000 W, and the power change condition is input as 40 min after heating by 1000 W power, and stored with the heating power changes when the heating power changes reach 2000 W as the same time; when the sauce is reduced to be thick, the cooking is finished through the operation unit, and timing is stopped; the weight detection unit obtains that the weight of the dish while finishing cooking is 1020 g, and the weight is stored, the parameter calculation unit obtains that the liquid margin indicating parameter R1=0.138 while finishing cooking through the formula $$R1 = \frac{(B1 - A1)}{A1},$$

wherein the value of R1 is the weight (1020 g) of the cooking material while finishing cooking; the weight detection unit obtains that the sum of the initial weights of the food materials and the spices added into the cooking material A1=896 g, and the parameter determination unit determines that the heating time after boiling is 38 min according to the liquid-boiling time point and the cooking finishing time; and the parameter calculation unit obtains the proportion of each cooking material according to the initial weight of each cooking material; the parameter calculation unit calculates the nutrient content, the purine content, the carbohydrate content and the calories of the dish cooked, wherein the specific data is as follows: the nutrient content includes 68.8 g protein, 15 g carbohydrate and 189.6 g fat; the caloric value is 2041 kcal, wherein 265 kcal is from the protein, 61 kcal is from the carbohydrate, and 1714 kcal is from the fat; the sugar content, i.e., the carbohydrate content is 15 g; the purine is 300 to 600 mg, and parameter calculation unit calculates the nutrient content, the purine content, the carbohydrate content, the calories and the salinity parameters of the dish per unit weight (per 100 g), wherein the specific data is as follows: the nutrient content includes 6.75 g protein, 1.47 g carbohydrate and 118.59 g fat; the caloric value is 200 kcal, the purine content is 29 to 58 mg; the sugar content is 1.47 g; and the salinity is 0.588 g.

The recipes generated by the recipe generation system may include, but are not limited to the following contents:

1. preprocessing of raw materials displayed by drawings and contents: ① cutting pork ribs into pieces ② blanching and draining off the pork ribs ③ adding Chinese prickly ash into cold water and boiling by big fire ④ adding the pork ribs after the water is boiled to boil the pork ribs up by big fire and then remove float foams ⑤ finishing out the pork ribs for standby use and ⑥ cutting green onion into segments;

2. the name, initial weight, proportion and addition order of each cooking material:

| edible oil | 30 g | 1.6% | NO1 |
| green onion | 40 g | 2.1% | NO2 |
| pock rib | 820 g | 43.0% | NO3 |
| light soy sauce | 30 g | 1.6% | NO4 |
| water | 980 g | 51.4% | NO5 |
| salt | 6 g | 0.3% | NO6 |

3. the nutrient content, calories, purine content, sugar content and salinity of the dish per unit weight (per 100 g):

| | |
|---|---|
| protein | 6.75 g/100 g |
| carbohydrate | 1.47 g/100 g |
| fat | 18.59 g/100 g |
| calories | 200 kcal/100 g |
| purine | 29-58 mg/100 g |
| sugar content | 1.47 g/100 g |
| salinity | 0.588 g/100 g |

4. cooking finishing condition: the liquid margin indicating parameter R1=0.138 and/or the heating time after boiling T2=38 minutes;

5. the relationship curve between the weight losses of the cooking materials and the cooking time;

6. including the addition occasion of each cooking material, the heating power changes during cooking and corresponding power change conditions, and other cooking procedure example, wherein the other cooking procedures during actual application may be stored by this form or other forms:

① the heating power while starting cooking is set as 80% of the maximum heating power; the target value of the temperature is 150° C., if the temperature exceeds the set temperature limit of the edible oil, i.e., the smoking point temperature, then the highest temperature is the smoking point temperature; the addition occasion of edible oil refers to the occasion when the target temperature value 150° C. is reached, and then "please add XXX g edible oil" is prompted; and the specific initial weight may be substituted in the subsequent cooking process of taking the recipe, and the same applies hereinafter; ② the edible oil is added, and the heating power is kept as the 80% of the maximum heating power; the target temperature value is 220° C., if the temperature exceeds the smoking point temperature of the edible oil selected, then the highest temperature is the smoking point temperature; and the addition occasion of green onion segments is the occasion when the target temperature value 220° C. is reached, and "please add XXX g green onion segments" is prompted; ③ the green onion segments are added, "stirring fry for 10 minutes" is prompted, and the target time value is controlled to be 10 seconds, and the temperature target value is controlled to be 200° C. to 220° C., or the smoking point temperature; and the addition occasion of pork ribs is the occasion when the target time value is reached, and "please add XXX g pork ribs" is prompted; ④ the pork ribs are added, and "continuously stirring fry till brown and confirming through the operation unit after completion" is prompted; and the target temperature value at this phase is to keep the temperature of the cooking material in the range from 180 to 190° C., the addition occasion of light soy sauce refers to the occasion when the user finishes the confirmation operation through the operation unit, and "please add XXX g light soy sauce" is prompted; ⑤ the light soy sauce is added, "stirring fry for 10 s" is prompted, the time target value is 10 seconds, the target temperature value is 180 to 190° C., the addition occasion of water refers to the occasion when the target time value 10 s is reached, and then "please add XXX g water" is prompted; ⑥ the water is added, the power change condition is adding water, then the heating power is set as 100% of the maximum heating power, the addition occasion of salt refers to the occasion after the water is added, and "please add XXX g salt" is prompted; ⑦ the salt is added, and the heating power is kept as 100% of the maximum heating power; ⑦ the boiling point of the liquid is determined, and "it is boiling for 20 seconds, the heating power will be reduced to transfer to a stewing state by soft fire, please cover the lid" is prompted after the liquid is boiled for 20 s; and ⑧ the power change condition is that the lid is covered, then the heating power is set as 45% of the maximum heating power, and the lid is automatically detected to be covered, otherwise "please cover the lid" is prompted continuously, the heating time after boiling T2=38 minutes, and/or the liquid margin indicating parameter R1=0.138 while finishing cooking, which is used as the cooking finishing condition; to be specific, when the liquid margin indicating parameter R1' in the current cooking process is equal to the liquid margin indicating parameter R1=0.138, cooking finishing is prompted, or when the heating time T2' after boiling in the current cooking process is equal to the heating time T2 after the boiling, cooking finishing is prompted; or when the heating time after boiling in the current cooking process is equal to the stored heating time after boiling, but the liquid margin indicating parameter R1' at the moment is not equal to 0.138, then "the heating time is ended but the spoon meat is much, the lid is opened to stir fry for quick reduction, and a confirmation button may be pushed to finish the cooking by hand" is prompted, when the lid is detected to be opened, then the heating power is set as 60% of the maximum heating power until the liquid margin indicating parameter R1' is equal to 0.138, and the cooking is finished; or when the liquid margin indicating parameter R1' is equal to the stored liquid margin indicating parameter R1, "the spoon meat has be less, but the cooking time is not ended, there is a risk of burning a pot, please confirm whether the dish is cooked and stir fry the dish, and the confirmation button may be pushed to finish cooking by hand" is prompted, if the operation unit does not receive the operation information of finishing cooking, then the cooking appliance is controlled to reduce the heating power to 30% of the maximum heating power, until the heating time after boiling is equal to the stored heating time after boiling, and the cooking is finished.

II. Process of Cooking According to the Stored Recipe:

The cooking recipe formed by the recipe generation system above is taken, the cooking materials are prepared and preprocessed according to the recipe, "intelligent cooking" and "heating" modes are automatically selected by the cooking appliance, "sunflower seed oil is selected as the edible oil, the smoking point temperature is 240° C., and the confirmation button may be pushed to select again" is prompted after the user sets the type of the edible oil; the weight of the remaining cooking materials is determined according to the initial weight of one of the food materials added into the cooking appliance and with reference to the proportion of each cooking material stored in the storage unit; for the initial weight of corresponding cooking material stored in the recipe instead of the weight of the remaining cooking materials determined, the initial weight of one of the food materials may be determined by the weight detection unit, and the initial weight of any food material may be input through the operation unit by the user, for example, when inputting that the weight of the pork ribs cooked in this time is 580 g, the system automatically calculates the reference weight of the cooking materials as follows:

| | | | |
|---|---|---|---|
| pork rib | 580 g | 43.0% | NO3 |
| edible oil | 22 g | 1.6% | NO1 |
| light soy sauce | 22 g | 1.6% | NO4 |
| water | 693 g | 51.4% | NO5 |

-continued

| | | | |
|---|---|---|---|
| green onion | 28 g | 2.1% | NO2 |
| salt | 4 g | 0.3% | NO6 |

The stored initial weights of the corresponding cooking materials in the recipe are replaced by the reference weight of the cooking materials above, "the cooking appliance is ready and please push the confirmation button to start" is prompted, the weight sensor is reset, and the cooking timing is started; the empty pot is heated, "add 22 g edible oil" is prompted, the reading of the weight sensor may be displayed in real time during addition, and a prompt may be given to the excessively more or less amount of oil added, and "XXX g edible oil has been added" is prompted after the reading of the weight sensor is stable; ② the edible oil is added, and the heating power is kept as 80% of the maximum heating power; the target temperature value is 220° C., if the temperature exceeds the smoking point temperature of the edible oil selected, then the highest temperature is the smoking point temperature; and the addition occasion of green onion segments is the occasion when the target temperature value 220° C. is reached, and then "please add 28 g green onion segments" is prompted; ③ the green onion segments are added, "stirring fry for 10 minutes" is prompted, and the target time value is controlled to be 10 seconds, and the temperature target value is controlled to be 200° C. to 220° C., or the smoking point temperature; the addition occasion of pork ribs is the occasion when the target time value is reached, and "please add 580 g pork ribs" is prompted; ④ the pork ribs are added, and "continuously stirring fry till brown and confirming through the operation unit after completion" is prompted; and the target temperature value at this phase is to keep the temperature of the cooking material in the range from 180 to 190° C., the addition occasion of light soy sauce refers to the occasion when the user finishes the confirmation operation through the operation unit, and "please add 22 g light soy sauce" is prompted; ⑤ the light soy sauce is added, "stirring fry for 10 s" is prompted, the target time value is 10 seconds, the target temperature value is 180 to 190° C., the addition occasion of water refers to the occasion when the target time value 10 s is reached, and then "please add 693 g water" is prompted; ⑥ the water is added, the power change condition is to add water, then the heating power is set as 100% of the maximum heating power, the addition occasion of salt refers to the occasion after the water is added, and "please add 4 g salt" is prompted; ⑦ the salt is added, and the heating power is kept as 100% of the maximum heating power; ⑦ the boiling point of the liquid is determined, and "it is boiling for 20 seconds, the heating power will be reduced to transfer to a stewing state by soft fire, please cover the lid" is prompted after the liquid is boiled for 20 seconds; and ⑧ the power change condition is that the lid is covered, then the heating power is set as 45% of the maximum heating power, and the lid is automatically detected to be covered, otherwise "please cover the lid" is prompted continuously, the heating time after boiling T2=38 minutes, and/or the liquid margin indicating parameter R1=0.138 while finishing cooking, which is used as the cooking finishing condition; to be specific, when the liquid margin indicating parameter R1' in the current cooking process is equal to the liquid margin indicating parameter R1=0.138, cooking finishing is prompted, or when the heating time T2' after boiling in the current cooking process is equal to the heating time T2 after the boiling, cooking finishing is prompted; or when the heating time after boiling in the current cooking process is equal to the stored heating time after boiling, but the liquid margin indicating parameter R1' at the moment is not equal to 0.138, then "the heating time is ended but the spoon meat is much, the lid is opened to stir fry for quick reduction, and a confirmation button may be pushed to finish the cooking by hand" is prompted, when the lid is detected to be opened, then the heating power is set as 60% of the maximum heating power until the liquid margin indicating parameter R1' is equal to 0.138, and the cooking is finished; or when the liquid margin indicating parameter R1' is equal to the stored liquid margin indicating parameter R1, "the spoon meat has be less, but the cooking time is not ended, there is a risk of burning a pot, please confirm whether the dish is cooked and stir fry the dish, and the confirmation button may be pushed to finish cooking by hand" is prompted, if the operation unit does not receive the operation information of finishing cooking, then the cooking appliance is controlled to reduce the heating power to 30% of the maximum heating power, until the heating time after boiling is equal to the stored heating time after boiling, and the cooking is finished; during cooking, the slope of the relationship curve in the current cooking process is compared with the slope of the relationship curve stored, when the slope of the relationship curve in the current cooking process is larger than the relationship curve stored, the cooking appliance is controlled to reduce the heating power according to the proportion of the slope, and when the slope of the relationship curve in the current cooking process is smaller than the relationship curve stored, the cooking appliance is controlled to increase the heating power according to the proportion of the slope; the dish weight at the end of the cooking is stored, "if you are more satisfied with this cooking taste, you may store the parameters of this cooking to convert into new recipe for later use" is prompted, the user may record the parameters of this cooking process after confirmation, and calculate the nutrient content, calories, purine content, sugar content and salinity of the dish per unit weight (per 100 g) of this dish again; when the user takes out the dish, the reduced value of the weight of each dish is obtained, and the nutrient content, the calories, the purine content, the sugar content and the salinity of the dish are calculated according to the nutrient content per unit weight obtained above, so as to obtain the intake of each meal.

The above is only preferred embodiments of the invention in details, but the protection scope of the invention is not limited to this. The equivalent replacement or change made by any skilled in the art within the technical scope discovered by the invention according to the technical solutions and inventive concepts of the invention shall fall within the protection scope of the invention.

What is claimed is:

1. A recipe generation system for a cooking appliance, wherein the recipe generation system comprises:
   an operation panel or an intelligent terminal configured to turn on and off the cooking appliance, set a name for each cooking material added into the cooking appliance, adjust heating power during cooking, input heating power changes during cooking and corresponding power change conditions, and input an addition occasion of each cooking material;
   a weight sensor configured to measure initial weights of the cooking materials sequentially added into the cooking appliance and measure the overall weight of the cooking materials during cooking and finishing cooking;
   a time calculator configured to calculate the cooking time;

a parameter calculator connected to the weight sensor and the time calculator, and configured to obtain proportions of the cooking materials based on the initial weights of the cooking materials and calculate weight losses of different cooking materials at different time points; wherein the weight loss at any cooking time point is equal to a difference value between the initial overall weight of the cooking materials and the overall weight of the cooking materials at the cooking time point;

a parameter determinator connected to the parameter calculator and the time calculator, and configured to determine a liquid-boiling time point according to changes of the weight losses of the cooking materials over the cooking time and to determine heating time after boiling according to the liquid-boiling time point and cooking finishing time;

a storage connected to the operation panel, the weight sensor, the parameter calculator and the parameter determinator, and configured to store the heating power while starting cooking, the heating power changes during cooking and the corresponding power change conditions, the initial weight and addition order of each cooking material, the addition occasion of each cooking material, the overall weight of the cooking materials while finishing cooking, the proportion of each cooking material, the heating time after boiling, and a change relationship of the weight losses of the cooking materials over the cooking time; and a recipe generator connected to the storage, and configured to form a recipe having each cooking procedure according to the data above and store the recipe into the storage.

2. The recipe generation system for a cooking appliance according to claim 1, wherein the cooking materials comprise food materials, liquid ingredients and spices; the parameter calculator is further configured to calculate a liquid margin indicating parameter R1 at different cooking time points using a formula $$R1 = \frac{(B1 - A1)}{A1},$$

wherein B1 is the overall weight of the cooking materials during cooking, and A1 is the sum of the initial weights of the food materials and the spices added into the cooking appliance; and the storage is further configured to store the liquid margin indicating parameter R1 while finishing cooking.

3. The recipe generation system for a cooking appliance according to claim 2, wherein the recipe generation system further comprises a curve generator connected to the parameter calculation calculator and the parameter determinator; the curve generator is configured to generate a relationship curve between the weight losses of the cooking materials and the cooking time; the parameter determinator is further configured to determines the cooking time corresponding to a first raised inflection point in the relationship curve as the liquid-boiling time point according to the relationship curve between the weight losses of the cooking materials and the cooking time generated by the curve generator; the parameter determinator is further configured to determine the heating time before boiling according to the liquid-boiling time point and the cooking starting time; and the storage is further configured to store the relationship curve between the weight losses of the cooking materials and the cooking time.

4. The recipe generation system for a cooking appliance according to claim 3, wherein the cooking procedures at least comprise:
the initial weight, addition order and addition occasion of each cooking material; and
a cooking finishing condition; wherein the heating time after boiling and/or the liquid margin indicating parameter R1 while finishing cooking is used as the cooking finishing condition.

5. The recipe generation system for a cooking appliance according to claim 3, wherein the parameter calculator is further configured to calculate a nutrient content, a purine content, a carbohydrate content, calories and a salinity of the dish per unit weight according to the initial weight of each cooking material and the overall weight of the cooking materials while finishing cooking; and the storage is further configured to store the nutrient content, the purine content, the carbohydrate content, the calories and the salinity of the dish per unit weight.

6. The recipe generation system for a cooking appliance according to claim 3, wherein the operation panel is disposed on the cooking appliance, or the intelligent terminal is connected to the cooking appliance.

7. The recipe generation system for a cooking appliance according to claim 3, wherein
the operation panel or intelligent terminal is further configured to input an operational occasion for taking down or covering a lid of the cooking appliance; and the cooking procedures further comprise: an operational occasion for taking down or covering the lid during cooking;
the cooking procedures further comprise each cooking action, a cooking action execution occasion, and cooking action duration; and
the operation panel or intelligent terminal is further configured to set a cooking action execution occasion, and input a cooking action name and a cooking action finishing operation, and the storage stores the cooking action, the corresponding cooking action execution occasion and the duration.

8. The recipe generation system for a cooking appliance according to claim 3, wherein the operation panel or intelligent terminal is further configured to receive an operation of setting edible oil types; the storage is stored with oil temperature limits corresponding to different edible oil types; the cooking appliance is also provided with a temperature sensor; and the heating power of the cooking appliance is controlled to make the highest temperature of the edible oil used currently be lower than the oil temperature limit.

9. A cooking appliance, comprising:
the recipe generation system according to claim 3, wherein the operation panel or intelligent terminal is further configured to receive recipe setting information;
a promptor;
a processor connected to the operation panel or intelligent terminal, the storage, the weight sensor and the promptor; wherein the processor is configured to take a corresponding recipe according to the recipe setting information, determines the weights of remaining cooking materials according to the initial weight of one of the food materials added into the cooking appliance with reference to the proportion of each cooking material stored in the storage, replace the initial weights of corresponding cooking materials in the recipe stored with the weights of the remaining cooking materials determined, and controls the promptor to prompt each cooking procedure in the recipe in sequence.

10. The cooking appliance according to claim 9, wherein the processor is configured to controls the cooking appliance to correspondingly adjust the heating power according to the heating power while starting cooking and when the current cooking process meets the power change conditions.

11. The cooking appliance according to claim 9, wherein the processor is also connected to the parameter calculator and the parameter determinator, when a liquid margin indicating parameter R1' in the current cooking process is equal to the stored liquid margin indicating parameter R1, the heating time after boiling in the current cooking process is judged whether to be larger than or equal to the stored heating time after boiling; if yes, the cooking appliance is controlled to finish cooking; otherwise, the promptor is controlled to prompt whether to finish cooking; after the prompt unit prompts whether to finish cooking, if the operation panel or intelligent terminal does not receive operation information of finishing cooking, then the cooking appliance is controlled to reduce the heating power, and when the liquid margin indicating parameter R1' is lower than a preset limit, the promptor is controlled to prompt to stir fry and give burnt warning; wherein, the liquid margin indicating parameter during cooking $$R1' = \frac{(B1' - A1')}{A1'},$$

the heating time after boiling in the current cooking process is determined according to the liquid-boiling time point and the cooking finishing time, wherein B1' is the overall weight of the cooking materials in the current cooking process, A1' is the sum of the initial weights of the food materials and the spices added into the cooking appliance in the current cooking process.

12. The cooking appliance according to claim 9, wherein the processor is also connected to the curve generator, wherein a slope of the relationship curve in the current cooking process is compared with a slope of the relationship curve stored according to the relationship curve generated between the weight losses of the cooking materials in the current cooking process and the cooking time, when the slope of the relationship curve in the current cooking process is larger than the slope of the relationship curve stored, the cooking appliance is controlled to reduce the heating power according to the proportion of slope, and when the slope of the relationship curve in the current cooking process is smaller than the slope of the relationship curve stored, the cooking appliance is controlled to increase the heating power according to the proportion of slope.

13. The cooking appliance according to claim 9, wherein the processor is also connected to the parameter calculator and the parameter determinator, when the heating time after boiling in the current cooking process is equal to the stored heating time after boiling, the liquid margin indicating parameter R1' in the current cooking process is judged whether to be smaller than or equal to the stored liquid margin indicating parameter R1; if yes, the cooking appliance is controlled to finish cooking; otherwise, the promptor is controlled to prompt whether to finish cooking; after the promptor prompts whether to finish cooking, if the operation panel or intelligent terminal does not receive operation information of finishing cooking, then the cooking appliance is controlled to increase the heating power, and when the liquid margin indicating parameter R1' is equal to the stored liquid margin indicating parameter R1, the cooking appliance is controlled to finish cooking; wherein, the liquid margin indicating parameter in the current cooking process $$R1' = \frac{(B1' - A1')}{A1'},$$

B1' is the overall weight of the cooking materials in the current cooking process, A1' is the sum of the initial weights of the food materials and the spices added into the cooking appliance in the current cooking process, and the heating time after boiling in the current cooking process is determined according to the liquid-boiling time point and the cooking finishing time.

14. The cooking appliance according to claim 9, wherein the parameter calculator is further configured to calculate a nutrient content, a purine content, a carbohydrate content, calories and a salinity of the dish per unit weight according to the initial weight of each cooking material and the overall weight of the cooking materials while finishing cooking; and the promptor is further configured to prompt the nutrient content, the purine content, the carbohydrate content, the calories and the salinity of the dish per unit weight.

15. The cooking appliance according to claim 9, wherein:
the processor is further configured to control the promptor to give overload warning when the sum of the weights of the cooking materials added into the cooking appliance exceeds the maximum containable weight of the cooking appliance;
the storage is also stored with the weight of a lid of the cooking appliance; and the processor is further configured to automatically judge a covering or taking down status of the lid when the weight sensor detects that the cooking appliance is increased or reduced by the weight equal to the weight of the lid stored.

16. The cooking appliance according to claim 9, wherein the processor is further configured to control the promptor to prompt that the cooking material is excessively more or less when any cooking material added into the cooking appliance is not within the weight scope of the cooking material determined.

17. The cooking appliance according to claim 14, wherein the weight sensor is further configured to measure the reduced weight of the dish in the cooking appliance after the dish is cooked; the parameter calculator is further configured to obtain the nutrient content, the purine content, the carbohydrate content, the calories and the salinity obtains the nutrient content, the purine content, the carbohydrate content, the calories and the salinity in the dish reduced according to the reduced weight of the dish with reference to the nutrient content, the purine content, the carbohydrate content, the calories and the salinity of the dish per unit weight, and prompts through the promptor.

* * * * *